United States Patent
Chen et al.

(10) Patent No.: US 9,573,650 B2
(45) Date of Patent: Feb. 21, 2017

(54) HIDDEN HYDRAULIC STRUCTURE OF BIKE DISC BRAKE

(71) Applicant: GIANT MANUFACTURING CO., LTD., Taichung (TW)

(72) Inventors: I-Teh Chen, Taichung (TW); Che-Wei Hsu, New Taipei (TW)

(73) Assignee: GIANT MANUFACTURING CO., LTD., Taichung (TW)

(\*) Notice: Subject to any disclaimer, the term of this patent is extended or adjusted under 35 U.S.C. 154(b) by 0 days.

(21) Appl. No.: 14/605,984

(22) Filed: Jan. 26, 2015

(65) Prior Publication Data

US 2015/0210347 A1 Jul. 30, 2015

(30) Foreign Application Priority Data

Jan. 29, 2014 (TW) .............................. 103202074 U

(51) Int. Cl.
*B62L 3/02* (2006.01)
*B60T 17/04* (2006.01)

(52) U.S. Cl.
CPC .............. *B62L 3/023* (2013.01); *B60T 17/046* (2013.01)

(58) Field of Classification Search
CPC .......... B62L 3/023; B62L 1/005; B60T 17/046
See application file for complete search history.

(56) References Cited

U.S. PATENT DOCUMENTS

| 6,003,639 A * | 12/1999 | Buckley | B62K 23/06 188/26 |
| 2007/0209885 A1* | 9/2007 | Becocci | B60T 11/046 188/24.22 |
| 2011/0162929 A1 | 7/2011 | Moore | |
| 2012/0241261 A1* | 9/2012 | Tsai | F16D 55/225 188/24.21 |
| 2013/0240313 A1* | 9/2013 | Moore | B60T 11/16 188/344 |

FOREIGN PATENT DOCUMENTS

| CN | 101468705 A | 7/2009 |
| CN | 201999156 U | 10/2011 |
| JP | H10316078 A | 12/1998 |
| JP | 3147178 U | 12/2008 |

\* cited by examiner

*Primary Examiner* — Vishal Sahni
(74) *Attorney, Agent, or Firm* — CKC & Partners Co., Ltd.

(57) ABSTRACT

A hidden hydraulic structure of a bike disc brake is integrally disposed with a bike body tube. The hidden hydraulic structure of the bike disc brake includes a base, a piston and a linking member. The base includes an oil circuit. The piston is located in the base for controlling a pressure of the oil circuit. The piston is actuated by the linking member. Wherein a shape of the base is corresponded to a shape of the bike body tube, and the base is connected with the bike body tube to form a portion of the bike body tube, thereby increasing strength of the bike body tube.

15 Claims, 9 Drawing Sheets

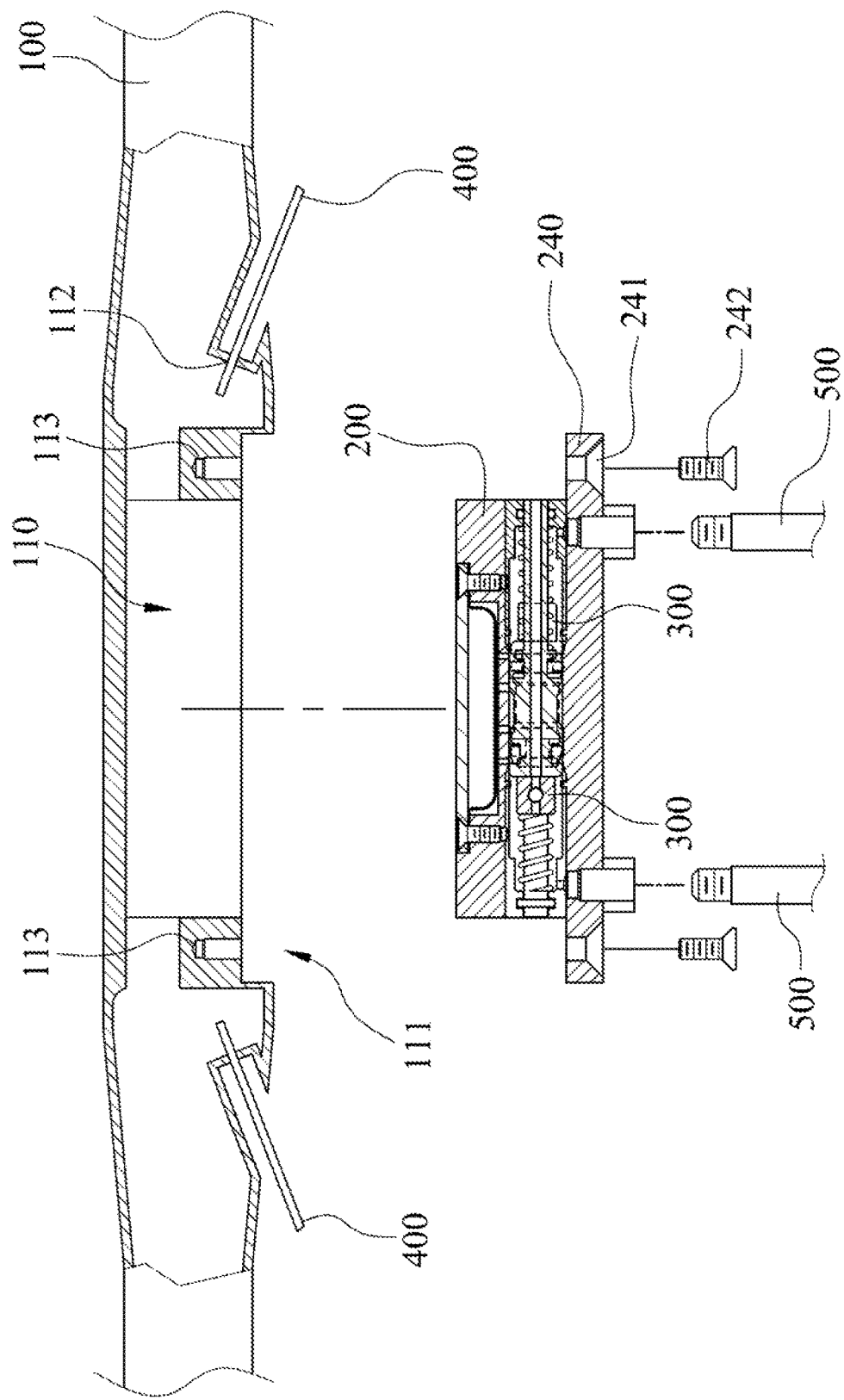

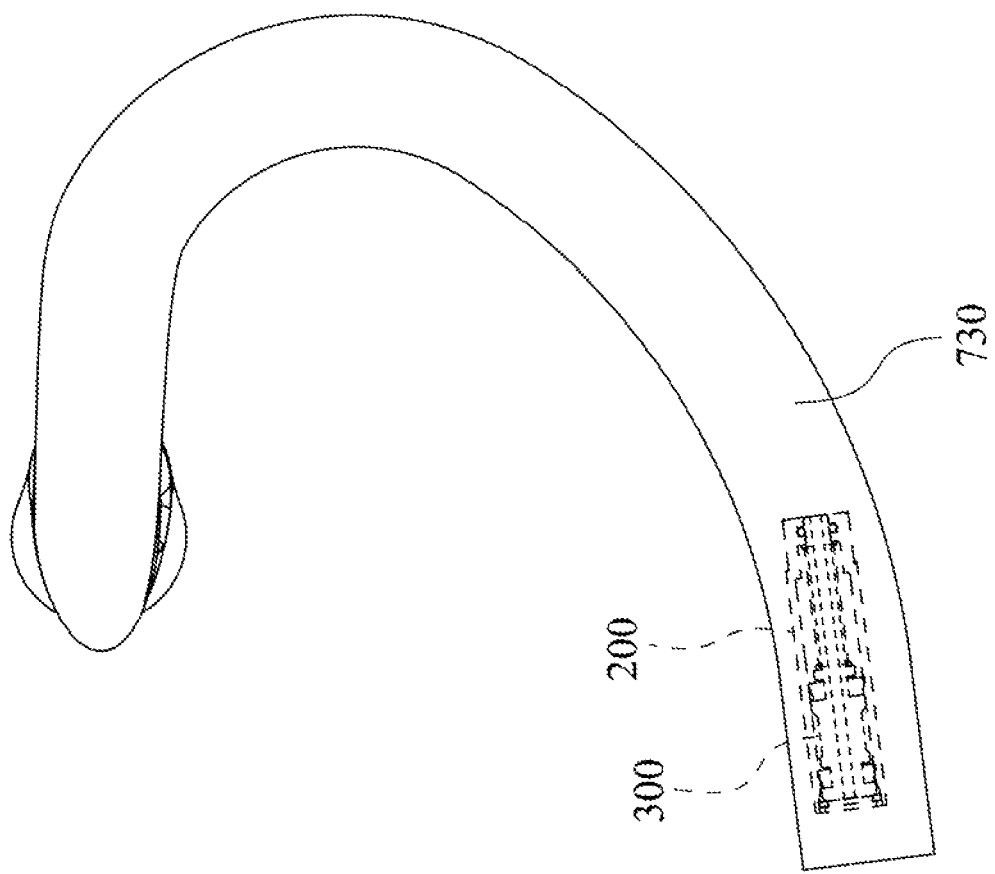

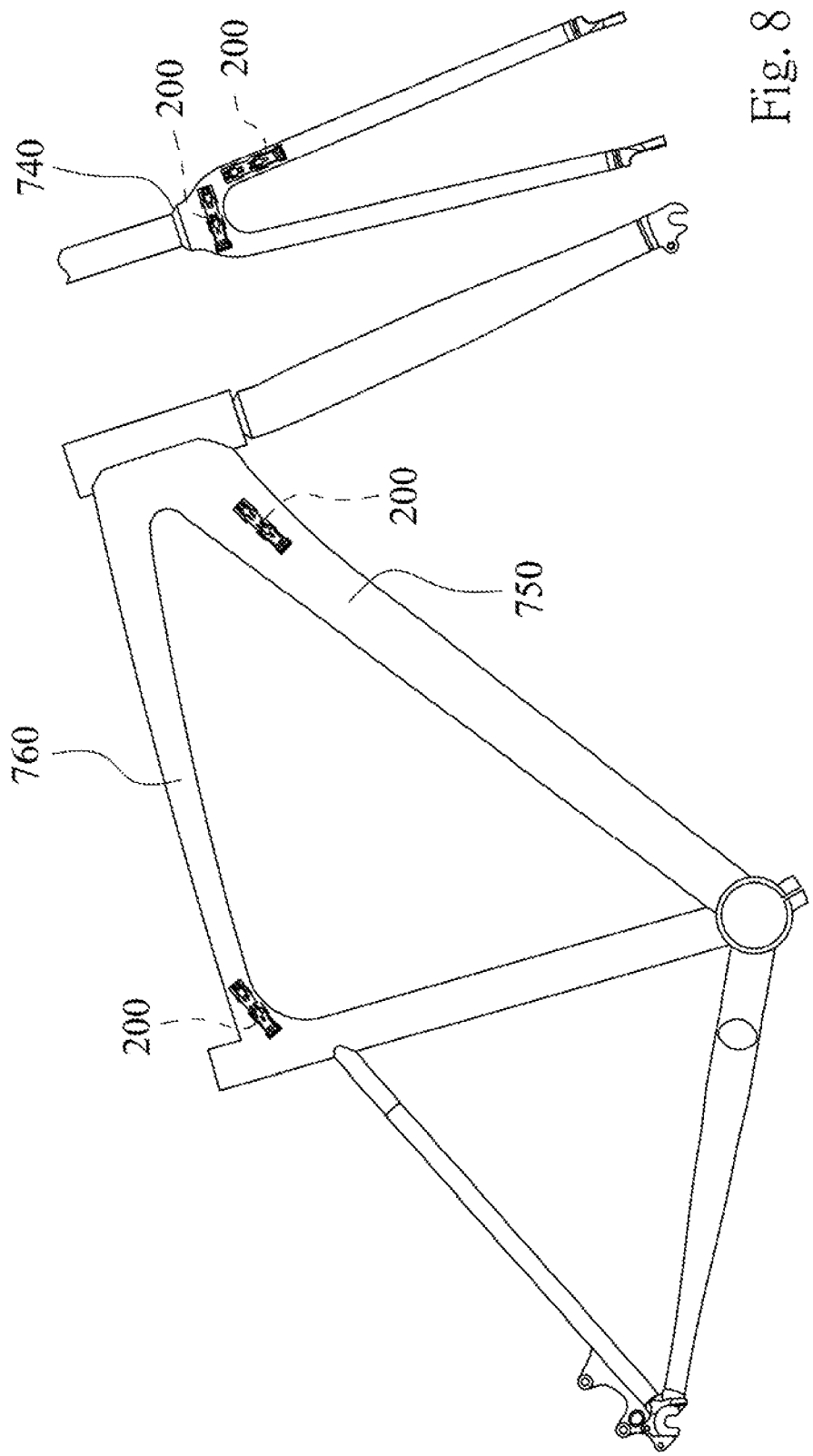

US 9,573,650 B2

HIDDEN HYDRAULIC STRUCTURE OF BIKE DISC BRAKE

RELATED APPLICATIONS

The application claims priority to Taiwan Application Serial Number 103202074, filed on Jan. 29, 2014, which is herein incorporated by reference.

BACKGROUND

Technical Field

The present disclosure relates to a hydraulic structure of a vehicle. More particularly, the present disclosure relates to a hidden hydraulic structure of a bike disc brake.

Description of Related Art

Bike has been a popular energy-smart product worldwide, The market of the bike has been wide expanded due to bike's advantages on sporty, energy conservation and functionalities on walk-substituting. In this situation, hydraulic bike disc brake having better braking effect has been reached to the market. Compared with the conventional mechanical bike disc brake, the hydraulic bike disc brake has advantages on stable braking power and high power transmitting efficiency, etc. Therefore, the hydraulic bike disc brake has been a representative of the high-end bikes.

Conventionally, the hydraulic bike disc brake has two types: full-hydraulic bike disc brake and half-hydraulic bike disc brake. When the half-hydraulic bike disc brake is disposed on the bike, in addition to that a disc brake and a hydraulic clamp must be disposed in the wheel; another set of hydraulic structure must be firmly disposed to the bike body. Moreover, brake cables must be connected to the piston in the hydraulic structure, and then a pressure from the hydraulic structure can be transmitted to the hydraulic clamp to produce a brake effect. This type of hydraulic structure of bike disc brake is commonly protruded from the bike body, thereby inducing a large windage, a heavy weight and an obtrusive appearance of the bike.

The full-hydraulic bike disc brake is commonly used in a bike having flat handlebar. If the full-hydraulic bike disc brake is intended to be disposed in a bike having, curve handlebar, issues will occur. For example, a hydraulic shift lever is very expensive and few kinds of hydraulic shift levers are available nowadays. For this reason, most of the shift lever uses a mechanical disc brake clamp. If the hydraulic bike disc brake is used, the hydraulic structure having piston must be disposed under a stem tube, thus a larger windage is produced.

SUMMARY

According to one aspect of the present disclosure, a hidden hydraulic structure of a bike disc brake is provided. The hidden hydraulic structure of the bike disc brake is connected with a bike body tube. The hidden hydraulic structure of bike disc brake includes a base, a piston and a linking member. The base includes an oil circuit. The piston is disposed in the base for controlling a pressure of the oil circuit. The piston is actuated by the linking member. Wherein a shape of the base is corresponded to a shape of the bike body tube, and the base is connected with the bike body tube to form a portion of the bike body tube, thereby increasing strength of the bike body tube.

According to another aspect of the present disclosure, a hidden hydraulic structure of bike disc brake is provided. The hidden hydraulic structure of bike disc brake includes a bike body tube, a base, a piston. The bike body tube has an accommodating space. The base is connected to the bike body tube, wherein the base includes an oil circuit and at least one positioning portion, and the positioning portion of the base is positioned in the accommodating space. The base can fully fill a surface of the accommodating space for increasing strength of the bike body tube. The piston is disposed in the base for controlling a pressure of the oil circuit. The linking member connects to the piston, and the linking member actuates the piston.

According to still another aspect of the present disclosure, a hidden hydraulic structure of bike disc brake is provided. The hidden hydraulic structure of bike disc brake includes a bike body tube, a base, a piston, a linking member and a controlling handle. The base is connected to the bike body tube, wherein the base includes an oil circuit and at least one positioning portion, and the positioning portion of the base is positioned in the accommodating space. The base can fully fill a surface of the accommodating space for increasing strength of the bike body tube. The piston is disposed in the base for controlling a pressure of the oil circuit. The linking member connects to the piston, and the linking member actuates the piston The controlling handle connects and controls the linking member.

BRIEF DESCRIPTION OF THE DRAWINGS

The present disclosure can be more fully understood by reading the following detailed description of the embodiment, with reference made to the accompanying drawings as follows:

FIG. 3A is a sectional view showing a hidden hydraulic structure of bike disc brake according to another embodiment of the present disclosure;

FIG. 7 is a perspective view showing that the hidden hydraulic structure of bike disc brake being disposed in a bar end tube in a handlebar tube according to one embodiment of the present disclosure;

FIG. 8 is a perspective view showing that the hidden hydraulic structure of bike disc brake being disposed in a front fork tube according to one embodiment of the present disclosure; and FIG. 9 is a perspective view showing that the hidden hydraulic structure of bike disc brake being disposed in a down tube and a top tube according to one embodiment of the present disclosure.

DETAILED DESCRIPTION

Figure 1:
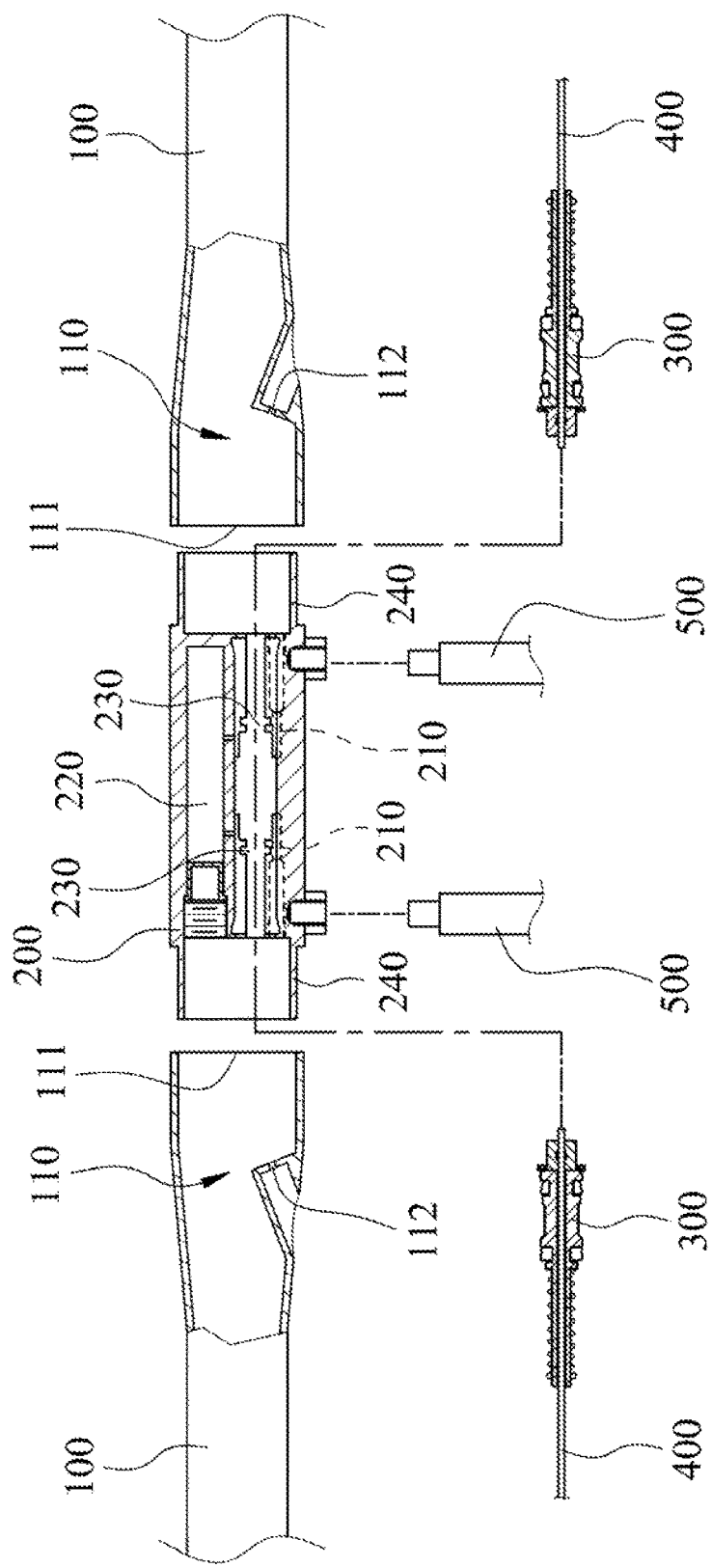
FIG. 1 is a sectional view showing a hidden hydraulic structure of bike disc brake according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

The present disclosure provides a hidden hydraulic structure of bike disc brake. Parts of the hidden hydraulic structure of bike disc brake can be bidden in a bike body tube, therefore the windage can be eliminated, the weight of the bike can be reduced, and the obtrusive appearance of the bike can be reduced.

Figure 2:
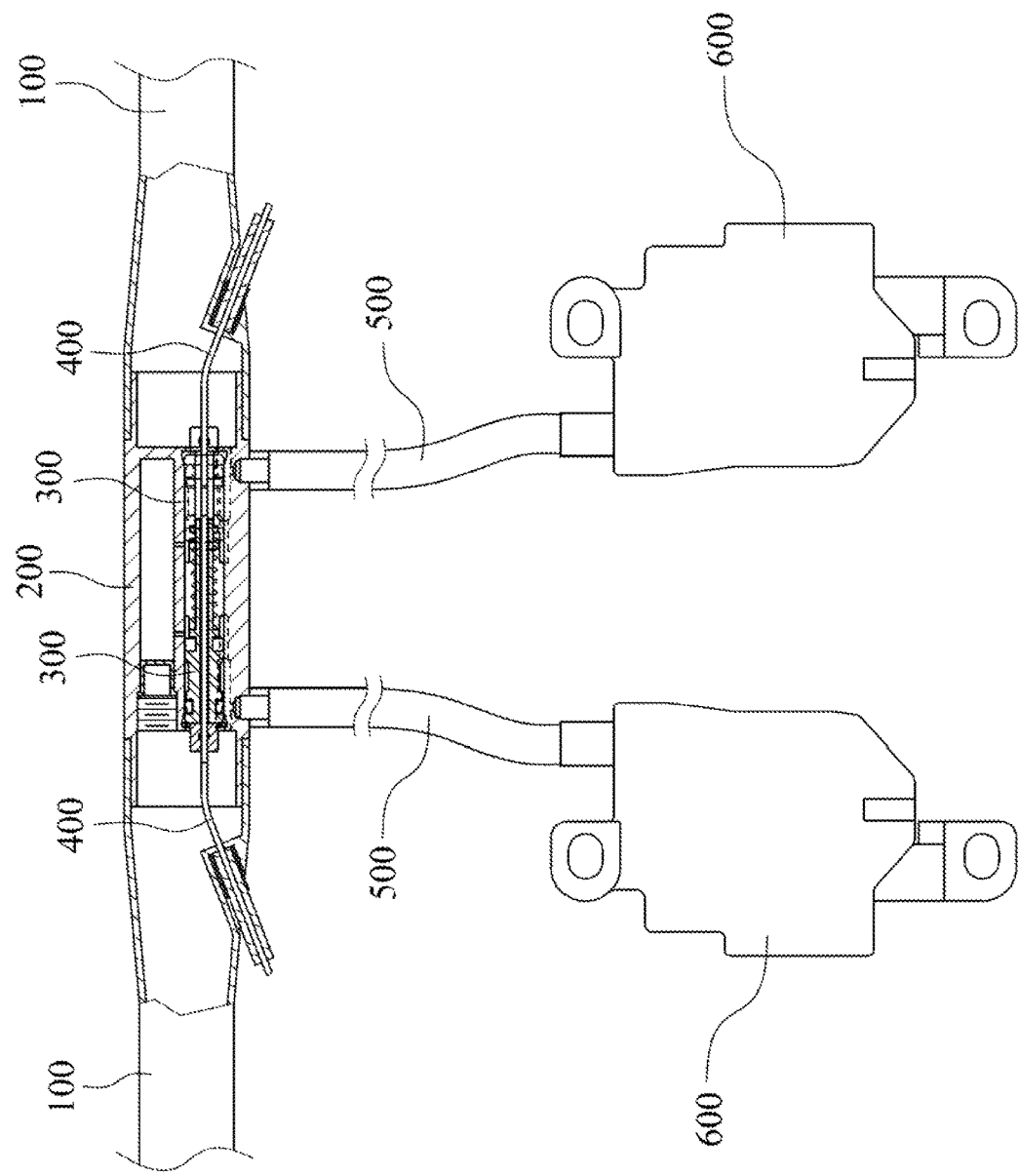
FIG. 2 is a sectional view showing that the hidden hydraulic structure of bike disc brake of FIG. 1 being assembled.

FIG. 1 is a sectional view showing a hidden hydraulic structure of bike disc brake according to one embodiment of the present disclosure. FIG. 2 is a sectional view showing that the hidden hydraulic structure of bike disc brake of FIG. 1 being assembled. A hidden hydraulic structure of bike disc brake includes two bike body tubes 100, a base 200, two pistons 300, two linking members 400, two oil tubes 500 and two disc braking units 600.

In FIG. 1, the two bike body tubes 100 are handlebar tubes. An accommodating space 110 is openly formed on two opposite sides of the two bike body tubes 100. The accommodating space 110 includes an opening 111 and a through hole 112. The opening 111 is opened outward. The through hole 112 is inclined outward. The two openings 111 are disposed oppositely and have the same shapes. It should be mentioned that the shapes of the two openings 111 can be different. For example, one of the openings 111 can be a square and the other of the openings 111 can be a circle.

The shape of the base 200 is corresponded to the two bike body tubes 100, and the base 200 is connected with the bike body tubes 100. Two oil circuits 210, one oil tank 220 and two piston channels 230 are disposed in the base 200. Two positioning portions 240 are disposed in two ends of the base 200 respectively, and the shapes of the two positioning portions 240 are corresponded to the two openings 111. The base 200 is positioned and is firmly connected in the two openings 111 of the bike body tube 100, thus the base 200 is partially hidden in the accommodating space 110.

Two pistons 300 are slidably disposed in the two piston channels 230 in the base 200 respectively. The two pistons 300 are used for controlling pressures of the two oil circuits 210 respectively.

One end of each of the linking members 400 passed through the through hole 112 and is dived into the bike body tube 100. The two linking members 400 are connected to the two pistons 300, and the two linking members 400 actuate the two pistons 300 to slide. The other end of each of the linking members 400 is stretched out front the bike body tube 100 (here connecting the linking member 400 to a controlling handle to form a brake is a known art, there is no repeated herein again).

One end of each of the two oil tubes 500 is assembled to the base 200, and the two oil tubes 500 are connected to the two oil circuits 210 respectively.

Two disc braking unit 600 are connected to the other end of the oil tubes 500 respectively. One of the disc braking units 600 is disposed in a front wheel of the bike, and the other of the disc braking units 600 is disposed in a rear wheel of the bike. The brake of the disc braking units 600 are controlled by the pressures of the two oil tubes 500. A controlling handle (not shown) is used to control each of the linking members 400 in order to change the pressure of the oil tube 500.

In the aforementioned embodiment, the shape and the appearance of the base 200 is corresponded to the two bike body tubes 100, and the base 200 is positioned in the two openings 111 of the bike body tubes 100 by the two positioning portions 240, thus the base 200 is partially hidden in the accommodating space 110. Furthermore, the through hole 12 is for dividing the two linking members 400 into the two bike body tubes 100. Therefore, the base 200 can be firmly positioned in the accommodating space 110, and the accommodating space 110 hiding the base 200 and the two linking members 400 in the middle of the two bike body tubes 100 (the shape or the appearance is not protruded). Compared with the conventional protruded hydraulic structure of bike disc brake, the base 200 and the two linking members 400 of the present discourse can be hidden totally. Therefore, the windage can be eliminated, and the influences on the appearance and the weight of the bike can also be reduced.

Figure 3B:
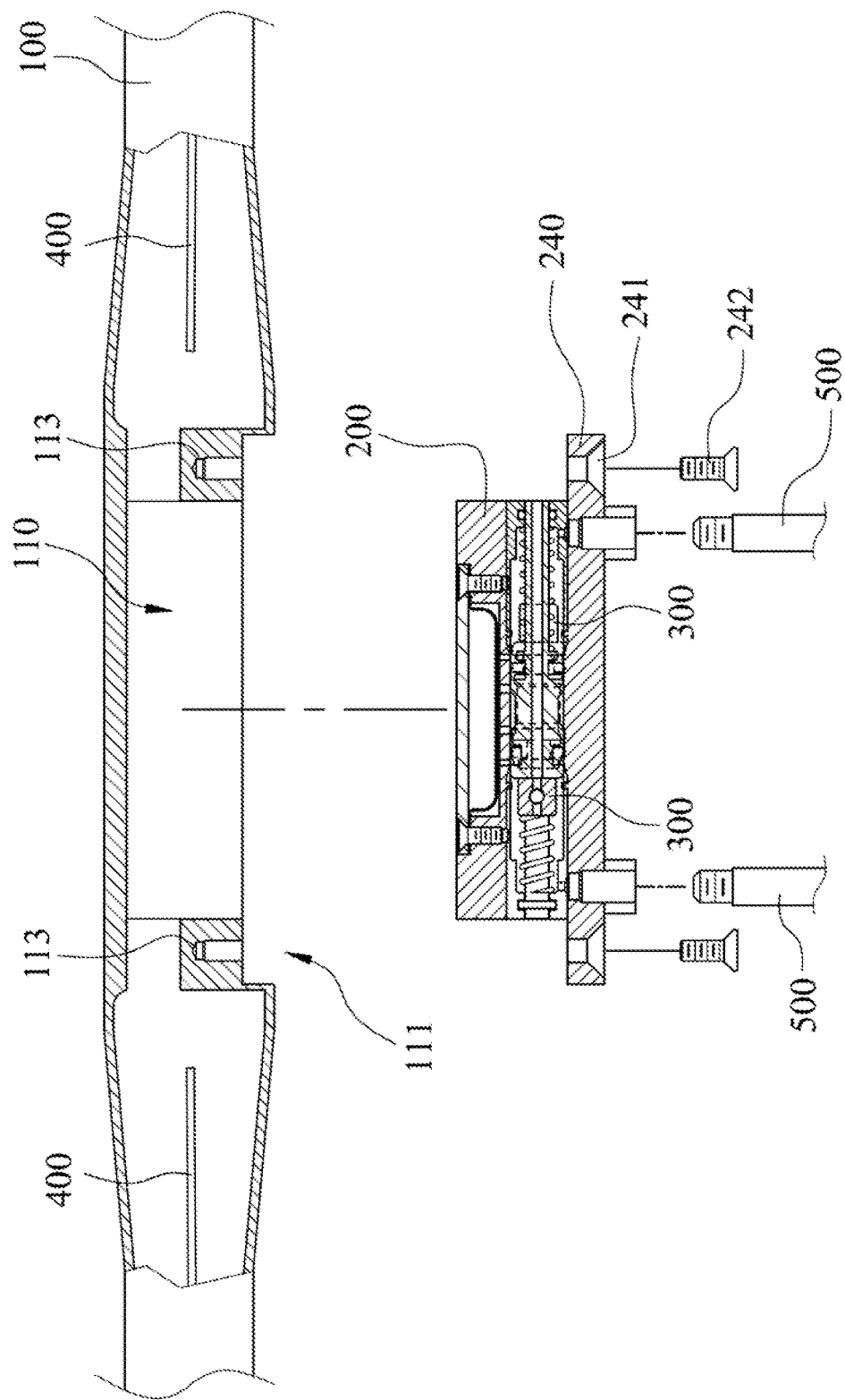
FIG. 3B is a sectional view showing another sample of the hidden hydraulic structure of bike disc brake of FIG. 3A.
Figure 4:
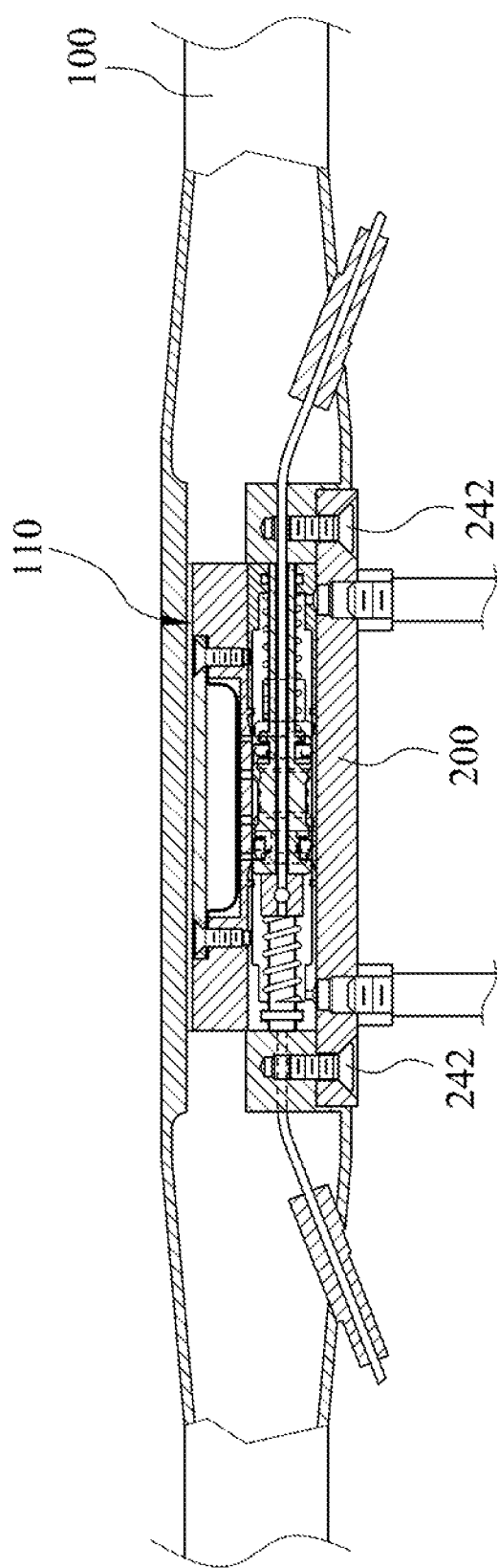
FIG. 4 is a sectional view showing that the hidden hydraulic structure of bike disc brake of FIG. 3A being assembled.

FIG. 3A is a sectional view showing a hidden hydraulic structure of bike disc brake according to another embodiment of the present disclosure. FIG. 3B is a sectional view showing another sample of the hidden hydraulic structure of bike disc brake of FIG. 3A. FIG. 4 is a sectional view showing that the hidden hydraulic structure of bike disc brake of FIG. 3A being assembled. In the embodiment, a hidden hydraulic structure of bike disc brake includes a bike body tube 100, a base 200, two pistons 300, two linking members 400, two oil tubes 500 and two disc braking units (not shown).

The integrated bike body tube 100 in this embodiment is a handlebar tube. An accommodating space 110 is openly formed in the middle portion of the bike body tube 100. The accommodating space 110 includes an opening 111 and two through holes 112 The opening 111 is opened outward. The two through holes 112 are formed in two inner-sides of the accommodating space 110 and are inclined outward. Two screw bases 113 are formed in the opening 111 of the bike body tube 100.

The appearance and the shape of the base 200 are corresponded to the surfaces of the two bike body tubes 100, and the base 200 is connected with the bike body tubes 100. Two positioning portions 240 are disposed in two ends of the base 200 respectively, and the shapes of the base 200 are corresponded to the two openings 111. Each of the two positioning portions 240 has a lock hole 241 respectively. The base 200 is screwed to the two screw bases 113 by two screws 242. Therefore, the base 200 is positioned in the opening 111 of the bike body tube 100, thus the base 200 can be hidden in the accommodating space 110. In the embodiment, the oil circuit, oil tank, piston channel, piston 300, linking member 400, oil tube 500 and disc braking unit are similar to the aforementioned embodiment, there is no repeated herein again.

In this embodiment, an integrated bike body tube 100 is cooperated with screwing technology to hide the base 200 into the accommodating space 110. Therefore, the windage can be eliminated, and the appearance of the whole bike will not be influenced. Furthermore, the base 200 can be modularized, thereby achieving easy assembling, disassembling, or replacing. Furthermore, in one example, as shown in FIG. 3B, the linking member 400 can be totally hidden in the bike body tube, therefore it is convenient for installing, and the linking member 400 will not be exposed out.

In the followed embodiments, examples for assembling the base 200 into another part of the bike are shown. Referring to FIGS. 5-9, FIG. 5 is a sectional view showing that the hidden hydraulic structure of bike disc brake being disposed in a head tube according to one embodiment of the present disclosure; FIG. 6 is a perspective view showing that the hidden hydraulic structure of bike disc brake being disposed in a bar end tube according to one embodiment of the present disclosure; FIG. 7 is a perspective view showing that the hidden hydraulic structure of bike disc brake being disposed in a bar end tube in a handlebar tube according to one embodiment of the present disclosure; FIG. 8 is a perspective view showing that the hidden hydraulic structure of bike disc brake being disposed in a front fork tube according to one embodiment of the present disclosure; and FIG. 9 is a perspective view showing that the hidden hydraulic structure of bike disc brake being disposed in a down tube and a top tube according to one embodiment of the present disclosure.

Figure 5:
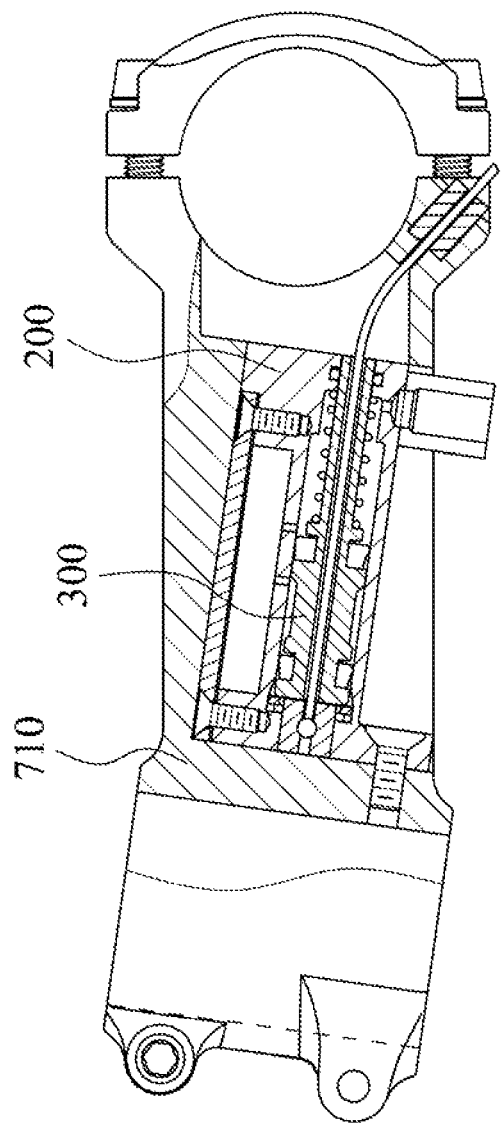
FIG. 5 is a sectional view showing that the hidden hydraulic structure of bike disc brake being disposed in a head tube according to one embodiment of the present disclosure.
Figure 6:
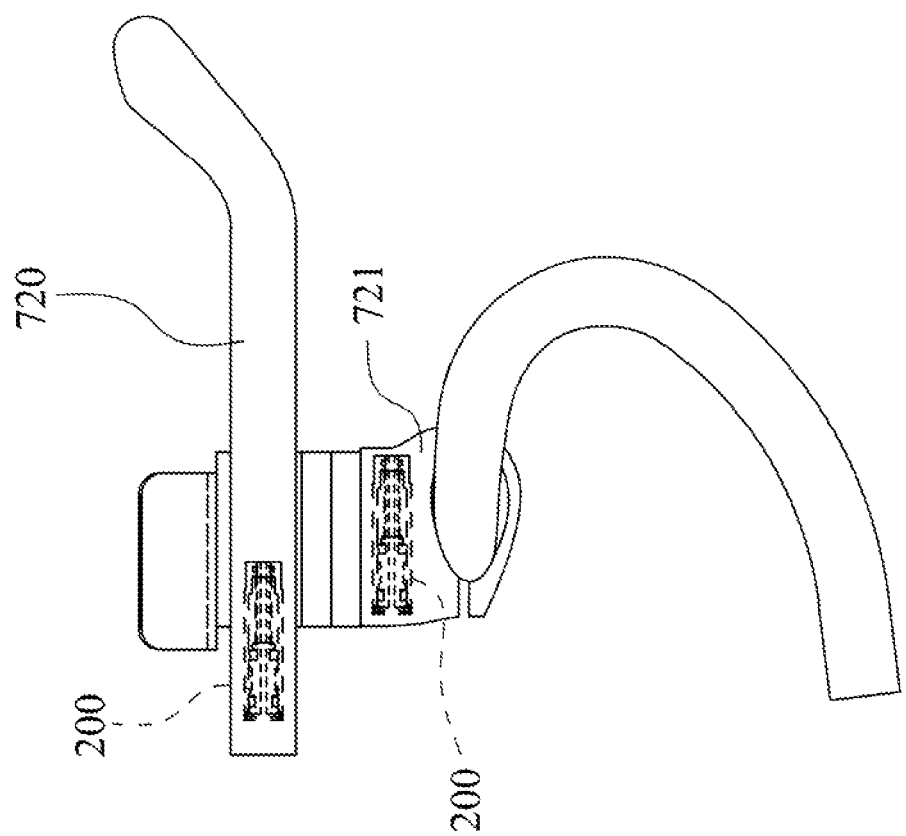
FIG. 6 is a perspective view showing that the hidden hydraulic structure of bike disc brake being disposed in a bar end tube according to one embodiment of the present disclosure.

In FIG. 5, a base 200 is screwed in a head tube 710 of the bike. In FIG. 5, one base 200 is corresponded to one piston 300. That is, another base 200 is required and is disposed in another part of the bike, and the disc harking unit in the front wheel and the rear wheel can be controlled by the two bases 200 respectively. It should be mentioned that if one base 200 having two pistons (now shown), and only one base 200 is required for controlling the disc braking units in the front wheel and the rear wheel of the bike.

In FIG. 6, the base 200 can be disposed in a bar end tube 720 or the bar end seat 721. Therefore, the base 200 can be disposed in the aforementioned two positions for controlling the disc braking units in the front wheel and the rear wheel respectively.

In FIG. 7, one base 200 is also corresponded to one piston, and two bases 200 are disposed in a curve handlebar 730 respectively.

In FIG. 8, two bases 200 are disposed in a front fork 740 of the bike for controlling the disc braking units in the front wheel and the rear wheel respectively.

In FIG. 9, one base 200 is disposed in a down tube 750 of the bike, and another base 200 is disposed in a top tube 760 of the bike. In FIG. 9, the two bases 200 are disposed closely to the front wheel and the rear wheel respectively, thereby being capable of easily controlling the disc braking units in the front wheel and the rear wheel.

It should be mentioned that the base 200 can also be disposed in another bike body tubes, such as a rear tray tube (can be a chain stay tube or a rear stay tube) or a stem tube, etc.

In sum up, the hidden hydraulic structure of bike disc brake of the present disclosure can be integrated with the bike body tube in various types. For example, the hidden hydraulic structure of bike disc brake can be connected with the bike body tube to form a portion of the bike body tube, the hidden hydraulic structure of bike disc brake can be hidden in the bike body tube, or the members of the hidden hydraulic structure of bike disc brake can be disposed in different bike body tubes. Accordingly, some parts or the total structure of the hidden hydraulic structure of bike disc brake can be hiddenly disposed in the bike body tube, and the hidden hydraulic structure of bike disc brake is not protruded out from the bike. Therefore, the windage can be eliminated, and the hidden hydraulic structure of bike disc brake of the present disclosure can be prevented from being broken or contaminated. Furthermore, the linking member can directly connect to the piston, and also directly actuates the piston; therefore, the installing process of the parts can be simplified, and the manufacturing cost can be reduced. The base can fully fill a surface of the accommodating space, thus the hidden hydraulic structure of bike disc brake can be fully integrated with the bike body tube, thereby increasing strength of the bike body tube.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A hidden hydraulic structure of a bike disc brake connected with a bike body tube, the hidden hydraulic structure of the bike disc brake comprising a base, piston and a linking member, wherein the base comprises an oil circuit, the piston is disposed in the base for controlling a pressure of the oil circuit, the piston is actuated by the linking member;

wherein a shape of an exposed portion of the base is corresponded to a shape of the bike body tube, and the base is detachably connected with the bike body tube to form a complete structure and shape of the bike body tube, thereby increasing strength of the body tube;

wherein the bike body tube comprises two handlebar tubes, the two handlebar tubes are symmetrically connected at two opposite sides of the base, and the linking member is hidden in the handlebar tubes.

2. The hidden hydraulic structure of the bike disc brake of claim 1, wherein the bike body tube comprises an accommodating space, and the base is detachably disposed in the accommodating space; and the linking member directly connects to the piston and actuates the piston.

3. The hidden hydraulic structure of the bike disc brake of claim 2, wherein the accommodating space is closed or opened.

4. The hidden hydraulic structure of the bike disc brake of claim 1, wherein the bike body tube comprises a head tube, a bar end tube, a stem tube, a top tube, a middle tube, a down tube, a front fork tube or a rear stay tube.

5. The hidden hydraulic structure of the bike disc brake of claim 1, further comprising a controlling handle connecting and controlling the linking member.

6. A hidden hydraulic structure of a bike disc brake, comprising:

a bike body tube having an accommodating space, wherein the bike body tube comprises two handlebar tubes located at two opposite sides, and the accommodating space is located in a center position of the bike body tube;

a base detachably assembled into the accommodating space and having a shape correspondent to a shape of the accommodating space, wherein the base comprises an oil circuit and at least one positioning portion, and the positioning portion of the base is positioned in the accommodating space, the base fully fills a surface of the accommodating space for increasing strength of the bike body tube;

a piston disposed in the base for controlling a pressure of the oil circuit; and a linking member connected to the piston, and the linking member actuating the piston and being hidden in the handlebar tubes.

7. The hidden hydraulic structure of the bike disc brake of claim 6, wherein the accommodating space is closed or opened.

8. The hidden hydraulic structure of the bike disc brake of claim 6, wherein the accommodating space has a screw base, the positioning portion has a lock hole, and a screw is passed through the lock hole and is screwed to the screw base.

9. The hidden hydraulic structure of the bike disc brake of claim 6, wherein the bike body tube comprises a head tube, a bar end tube, a stem tube, a top tube, a middle tube, a down tube, a front fork tube or a rear stay tube.

10. The hidden hydraulic structure of the bike disc brake of claim 6, wherein,
two oil circuits are disposed in the base;
two pistons are disposed in the base for controlling the pressures of the two oil circuits respectively;
two linking members are directly connected to the two pistons, and the two linking members actuate the two pistons respectively;
two oil tubes are connected to the two oil circuits respectively; and
two disc braking units are connected to the two oil tubes respectively, and the two disc braking units are for braking a front wheel and a rear wheel respectively.

11. The hidden hydraulic structure of the bike disc brake of claim 6, wherein,
a number of the bike body tube is two, the two bike body tubes have two opposite openings, and two accommodating spaces are located in the two openings respectively; and
the base is connected between the two openings.

12. A hidden hydraulic structure of a bike disc brake, comprising:
a bike body tube having an accommodating space;
a base connected to the bike body tube and having a shape correspondent to a shape of the accommodating space, wherein the base comprises an oil circuit and at least one positioning portion, and the positioning portion of the base is positioned in the accommodating space, the base fully fills a surface of the accommodating space for increasing strength of the bike body tube;
a piston disposed in the base and controlling a pressure of the oil circuit;
a linking member connected to the piston, and the linking member actuating the piston; and
a controlling handle connecting and controlling the linking member;
wherein the body tube comprises two handlebar tubes, and the base and the linking member are hidden in the handlebar tubes.

13. The hidden hydraulic structure of the bike disc brake of claim 12, wherein the accommodating space is close or open.

14. The hidden hydraulic structure of the bike disc brake of claim 12, wherein the accommodating space has a screw base, the positioning portion has a lock hole, and a screw is passed through the lock hole and is screwed to the screw base.

15. The hidden hydraulic structure of the bike disc brake of claim 12, wherein,
two oil circuits are disposed in the base;
two pistons are disposed in the base for controlling the pressures of the two oil circuits respectively;
two linking members are directly connected to the two pistons, and the two linking members actuate the two pistons respectively;
two oil tubes are connected to the two oil circuits respectively; and
two disc braking units are connected to the two oil tubes respectively, and the two disc braking units are for braking a front wheel and a rear wheel of respectively.

* * * * *